(12) United States Patent
Iwata et al.

(10) Patent No.: US 6,382,368 B2
(45) Date of Patent: May 7, 2002

(54) DRUM-IN DISC BRAKE

(75) Inventors: Yukio Iwata; Yutaka Nishikawa, both of Tokyo (JP)

(73) Assignee: Akebono Brake Industry Co., Ltd., Tokyo (JP)

(*) Notice: Subject to any disclaimer, the term of this patent is extended or adjusted under 35 U.S.C. 154(b) by 0 days.

(21) Appl. No.: 09/897,397

(22) Filed: Jul. 3, 2001

(30) Foreign Application Priority Data

Jul. 4, 2000 (JP) .......................................... 2000-202455

(51) Int. Cl.[7] .............................................. F16D 63/00
(52) U.S. Cl. ........................................ 188/74; 188/73.45
(58) Field of Search ........................... 188/70 R, 73.31, 188/73.39, 73.45, 73.47, 74, 78

(56) References Cited

U.S. PATENT DOCUMENTS

| 4,784,241 A | * | 11/1988 | Temple et al. | 188/70 R |
| 4,854,423 A | * | 8/1989 | Evans et al. | 188/70 R |
| 4,995,481 A | * | 2/1991 | Temple et al. | 188/70 R |
| 5,172,792 A | * | 12/1992 | Cartwright et al. | 188/71.1 |
| 5,931,267 A | * | 8/1999 | Iwata et al. | 188/73.45 |

FOREIGN PATENT DOCUMENTS

| JP | 2-66330 | 3/1990 |
| JP | Hei 9-250572 | 9/1997 |

* cited by examiner

*Primary Examiner*—Christopher P. Schwartz
(74) *Attorney, Agent, or Firm*—Morgan, Lewis & Bockius LLP

(57) ABSTRACT

A support member of a disc brake and a backing plate of a drum brake are formed integrally, and a pair of pin supporting portions for respectively supporting a pair of caliper slide pins are provided in the support member so that the pair of caliper slide pins supporting a caliper are passed through on a radially outward side of a rotor portion.

3 Claims, 7 Drawing Sheets

DRUM-IN DISC BRAKE

BACKGROUND OF THE INVENTION

1. Field of the Invention

The present invention relates to a drum-in disc brake in which a drum brake is incorporated in a central portion of a disc rotor of a disc brake. More particularly, the present invention concerns improvements for realizing the reduction of fabrication steps and assembling steps and the improvement of the detachability and attachability of the disc rotor during maintenance and the like.

2. Description of the Related Art

FIGS. 8 and 9 show a conventional example of a drum-in disc brake.

A drum-in disc brake 1 shown here is disclosed in JP-A-2-66330, and is constructed such that a drum brake 23 is incorporated in a central portion of a disc rotor 3 of a disc brake 15.

To give a more detailed description, the disc brake 15 is used as a service brake and includes: the disc rotor 3 which is mounted on the wheel side and is formed by integrating a cylindrical drum portion 3a having a bottom and a rotor portion 3b jutting out in the form of a collar from an edge of an opening of the drum portion 3a toward the radially outward side; a caliper 9 for supporting a pair of friction pads 5 and 6 disposed in face-to-face relation with the rotor portion 3b placed therebetween in such a manner as to be capable of pressing the pair of friction pads 5 and 6 against the rotor portion 3b; and a support member 13 which is fixedly fitted on the vehicle body side and supports the caliper 9 in such a manner as to be capable of displacing the caliper 9 in the axial direction of the disc rotor 3 (in the direction of arrow (A) in FIG. 9) by a pair of caliper slide pins 11 extending in the axial direction of the disc rotor 3.

Meanwhile, the drum brake 23 is used as a parking brake and includes a backing plate 17 mounted on the vehicle body side so as to cover the opening of the drum portion 3a, and a pair of brake shoes 19 and 20 which are supported by the backing plate 17 and are capable of pressing against the inner peripheral surface of the drum portion 3a.

With the conventional drum-in disc brake 1, however, as shown in the drawings, the support member 13 of the disc brake 15 and the backing plate 17 of the drum brake 23 are formed separately, and are arranged to be integrated by fastening with screws or the like after being fabricated individually. Therefore, there has been a problem in that the numbers of fabrication steps and assembling steps increase, leading to an increase in the manufacturing cost.

In addition, since the arrangement provided is such that, as shown in the drawings, the positions where the caliper slide pins 11 are provided are set on a circumference located inwardly of the outside diameter of the rotor portion 3b, and the caliper slide pins 11 are present only on one side of the disc rotor 3, there has been a possibility that a bending stress can be applied to the caliper 9 due to the braking torque of the outer-side friction pad 6 located away from the caliper slide pins 11 during the application of the service brake. This may lead to an increase in the sliding resistance due to the caliper slide pins 11 and the uneven wear of the friction pads.

Further, to pull out the disc rotor 3 in the axial direction for the purpose of the maintenance of the-brake, it is necessary to remove first the two caliper slide pins 11 located in the range smaller than the outside diameter of the disc rotor and then to remove the caliper 9, so that the maintenance operation of the disc rotor has not been easy.

SUMMARY OF THE INVENTION

The present invention has been devised in view of the above-described circumstances, and its object is to provide a drum-in disc brake which is capable of realizing the reduction of fabrication steps and assembling steps and the improvement of the detachability and attachability of the disc rotor during maintenance and the like.

To attain the above-object of the present invention, there is provided a drum-in disc brake for braking a rotating member which is rotatable with a wheel and formed by integrating a cylindrical drum portion and a rotor portion jutting out in the form of a collar from the drum portion toward a radially outward side. The drum-in disc includes a disc brake and a drum brake. The disc brake includes: an inner friction pad and an outer friction pad, respectively disposed in face-to-face relation with the rotor portion placed therebetween; a caliper for pressing the inner friction pad and the outer friction pad against the rotor portion; and a support member which is fixedly fitted on a vehicle body side and supports the caliper, wherein the support member is capable of displacing the caliper in an axial direction of the rotating member by caliper slide pins. The drum brake includes: a backing plate mounted on the vehicle body side; and brake shoes which are respectively supported by the backing plate and are capable of pressing against an inner peripheral surface of the drum portion. The drum-in disc brake is capable of effecting braking by the disc brake and braking by the drum brake, the support member of the disc brake and the backing plate of the drum brake are formed integrally, and the disc brake is constructed such that the outer friction pad is supported by a claw portion of the caliper so that the brake torque of the outer friction pad is transmitted to the support member through the caliper and the caliper slide pins, and pin supporting portions for respectively supporting the caliper slide pins are provided in the support member so that the caliper slide pins supporting the caliper are passed through on a radially outward side of the rotor portion.

In accordance with the above-described arrangement, the support member and the backing plate are integrally formed to reduce the number of constituent parts. Further, as compared with the case where the support member and the backing plate are formed as separate parts, it is possible to reduce the quantity of screw members and the like necessary for fixation to the vehicle body. Thus, by the reduction of the numbers of fabrication steps and assembling steps, it is possible to attain the reduction of the manufacturing cost.

In addition, since the structure provided is such that the caliper slide pins straddle an outer periphery of the disc rotor, and the caliper can be supported-uniformly on both sides of the rotor portion, it becomes difficult for an inclination or the like to occur in the caliper due to the braking torque of the friction pads during the application of a service brake, and it is possible to suppress an increase in the frictional resistance based on the caliper slide pins and reduce the uneven wear of the friction pads.

Furthermore, since the pin supporting portions are passed through on the outer side of the outside diameter of the rotor portion, when the disc rotor is pulled out in the axial direction for the purpose of such as the maintenance of the brake, if only one caliper slide pin is removed, and the caliper is rotated about the remaining caliper slide pin, there is no longer an obstacle in the axial direction of the disc rotor. Hence, even if the caliper is not removed, it is possible to pull out the disc rotor. Accordingly, it is possible to realize the improvement of the detachability and attachability of the disc rotor during maintenance and the like.

It should be noted that, in the above-described drum-in disc brake, it is preferred that the support member and the backing plate are integrally molded by casting an aluminum material. By so doing, it is possible to attain light weight at the same time.

BRIEF DESCRIPTION OF THE DRAWINGS

FIG. 1 is a front elevational view of an embodiment of a drum-in disc brake in accordance with the present invention;

DETAILED DESCRIPTION OF THE PREFERRED EMBODIMENTS

Figure 1:
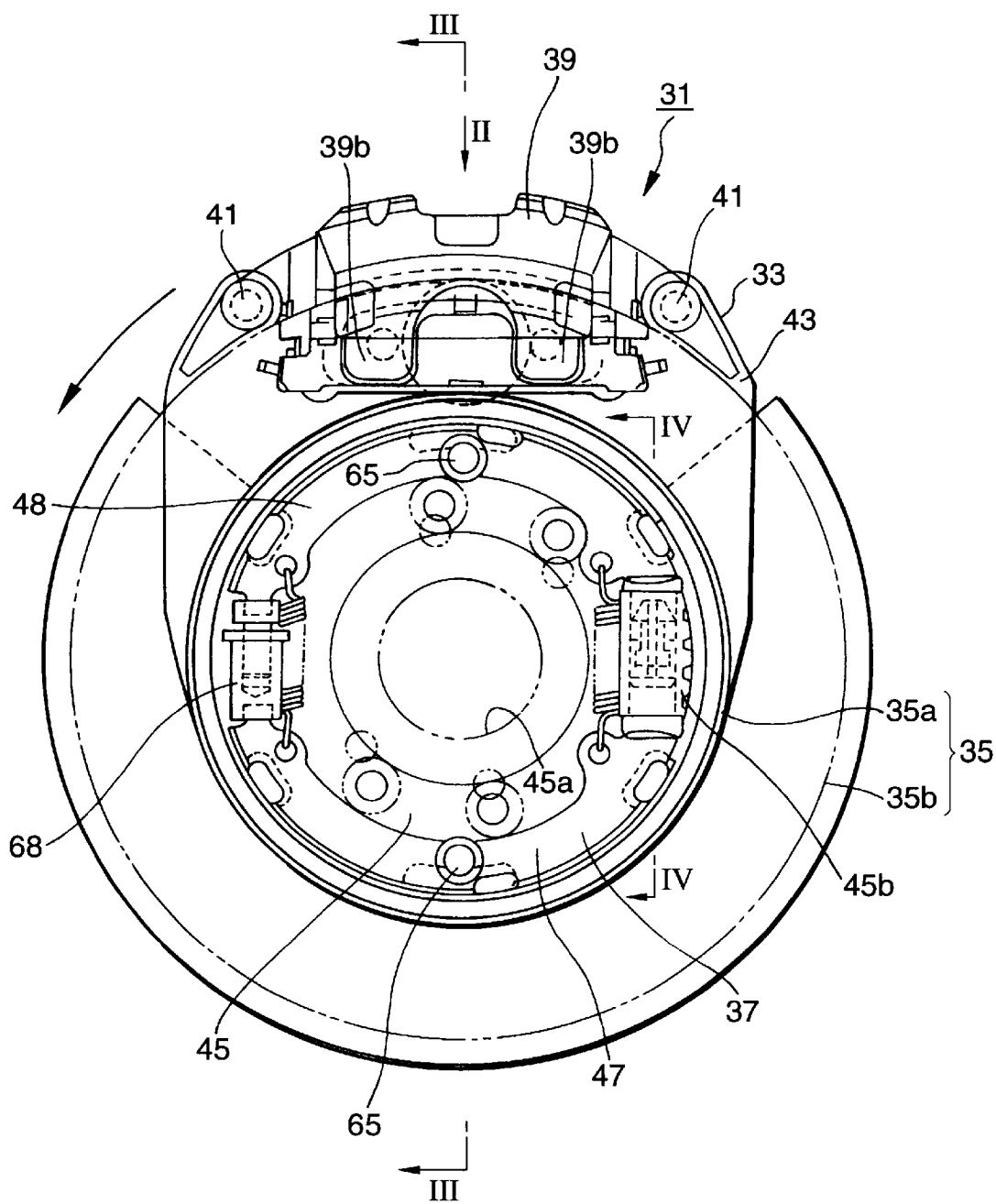
FIG. 1 shows an embodiment of the present invention.

Referring now to the drawings, a detailed description will be given of a preferred embodiment of a drum-in disc brake in accordance with the present invention.

Figure 2:
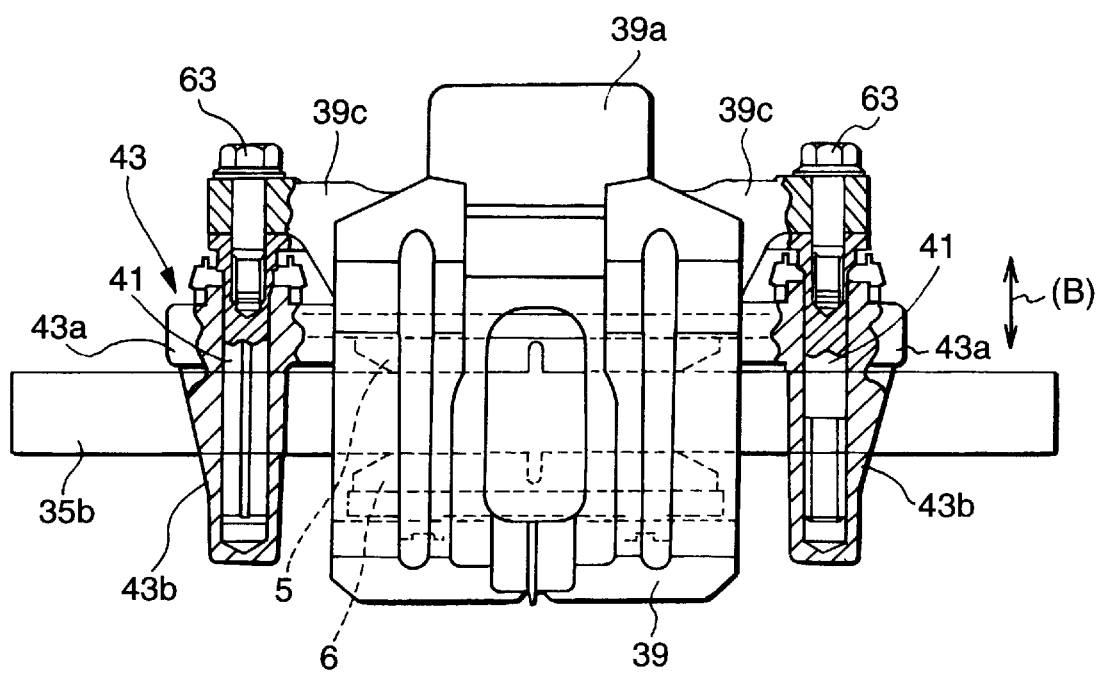
FIG. 2 is a view taken in the direction of an arrow II in FIG. 1.
Figure 3:
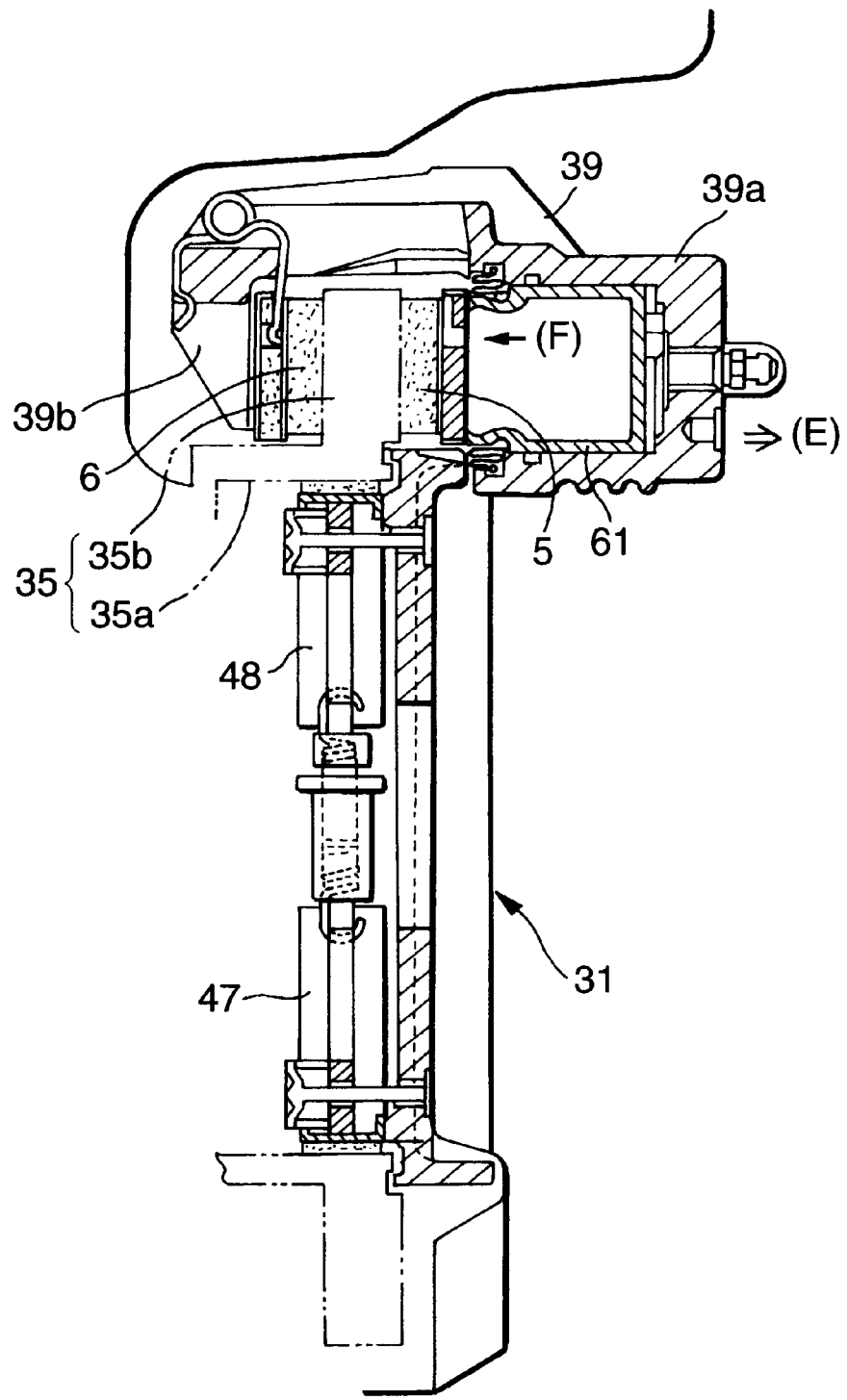
FIG. 3 is a cross-sectional view taken along a line III—III in FIG. 1.

FIG. 1 shows an embodiment of the drum-in disc brake in accordance with the present invention, and. FIG. 1 is a front elevational view of the drum-in disc brake in accordance with the present invention. FIG. 2 is a view taken in the direction of an arrow II in FIG. 1. FIG. 3 is a cross-sectional view taken along a line III—III in FIG. 1.

Figure 4:
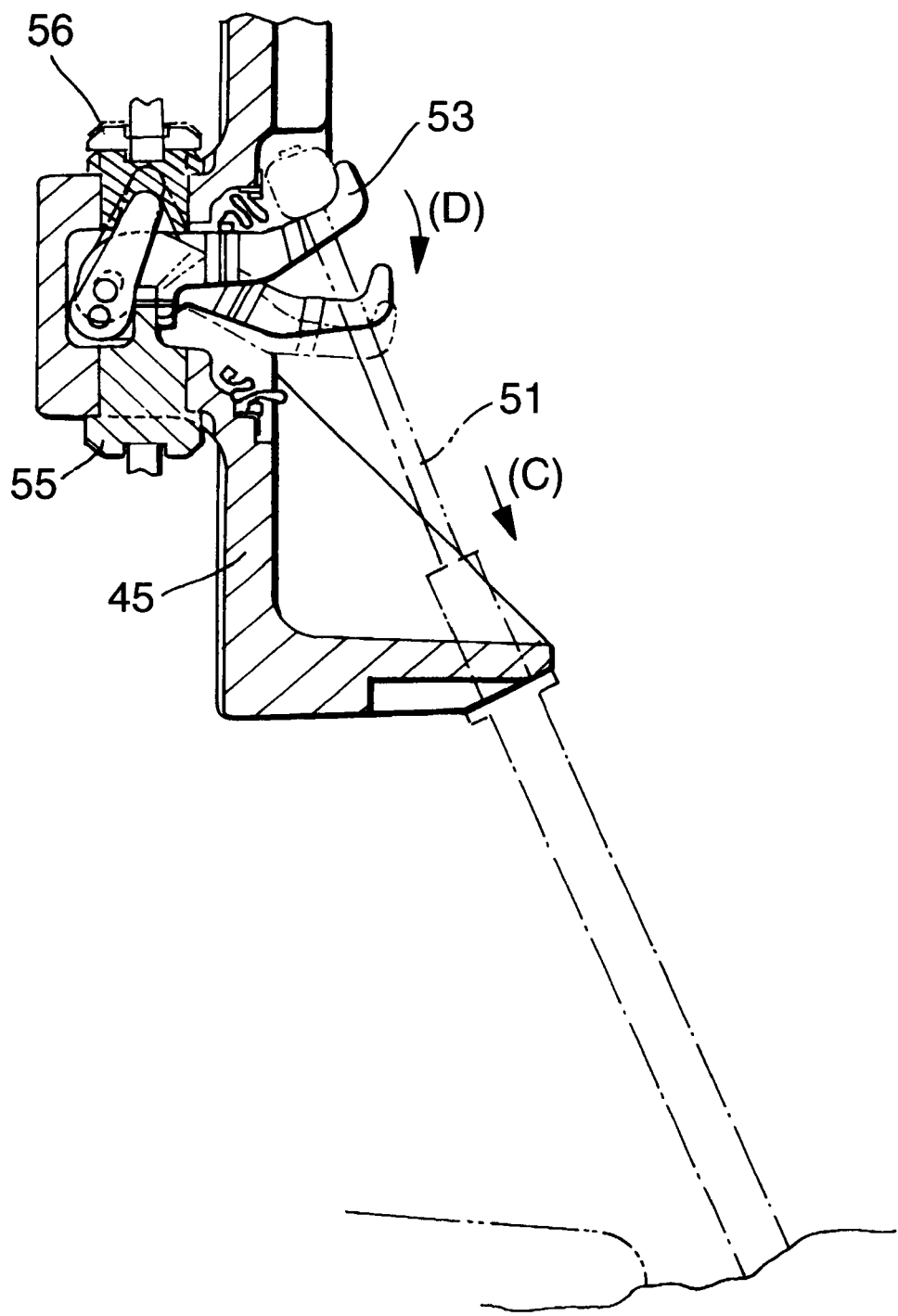
FIG. 4 is a cross-sectional view taken along a line IV—IV in FIG. 1 and is a schematic diagram of a parking brake.
Figure 5:
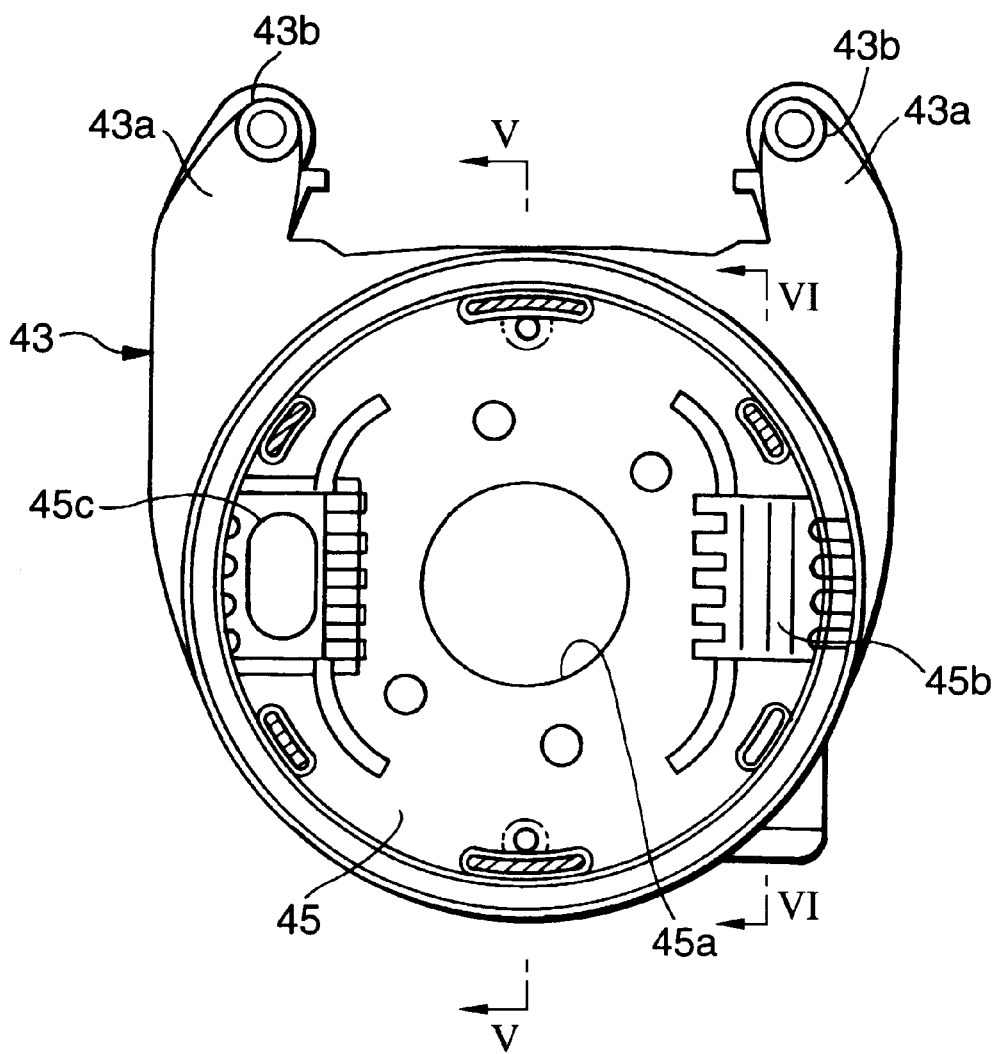
FIG. 5 is a front elevational view of a support member in the drum-in disc brake shown in FIG. 1.
Figure 6:
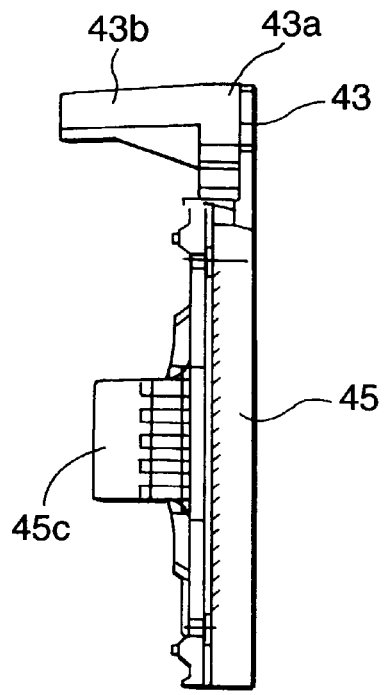
FIG. 6 is a cross-sectional view taken along a line V—V in FIG. 5.
Figure 7:
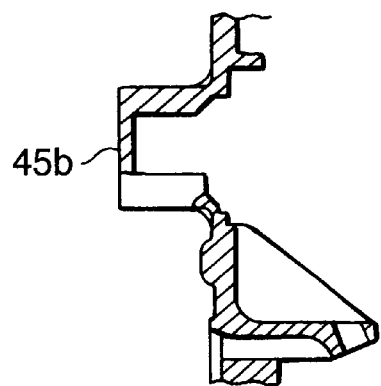
FIG. 7 is a cross-sectional view taken along a line VI—VI in FIG. 5.
Figure 8:
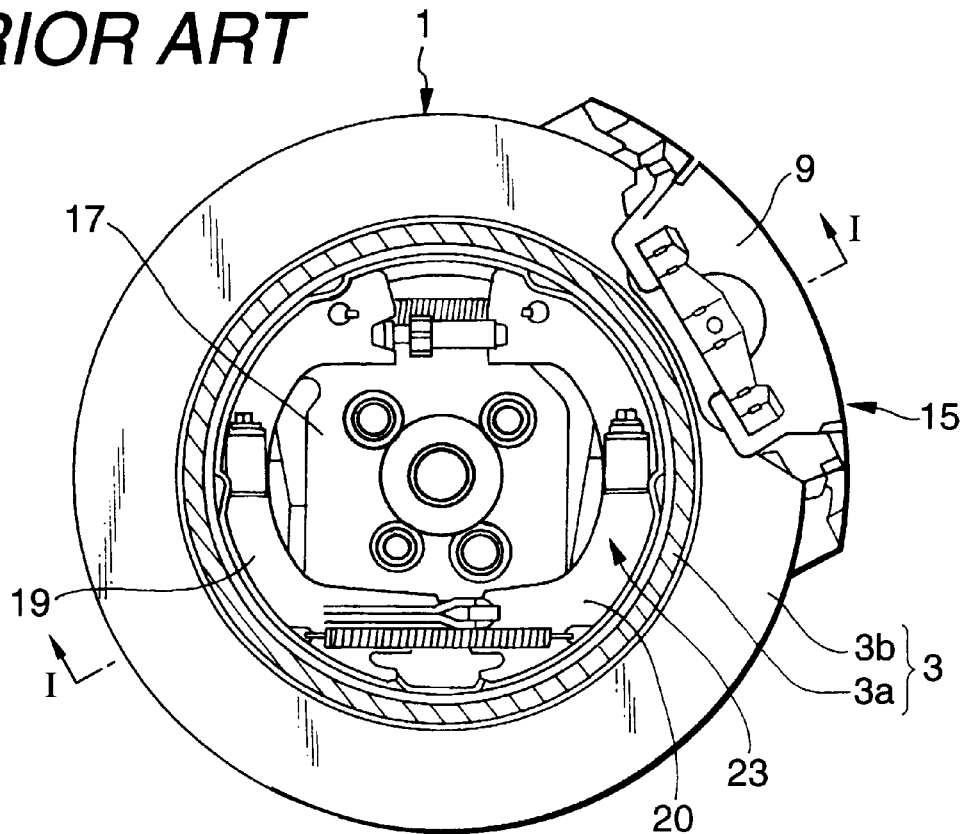
FIG. 8 is a front elevational view of a conventional drum-in disc brake.
Figure 9:
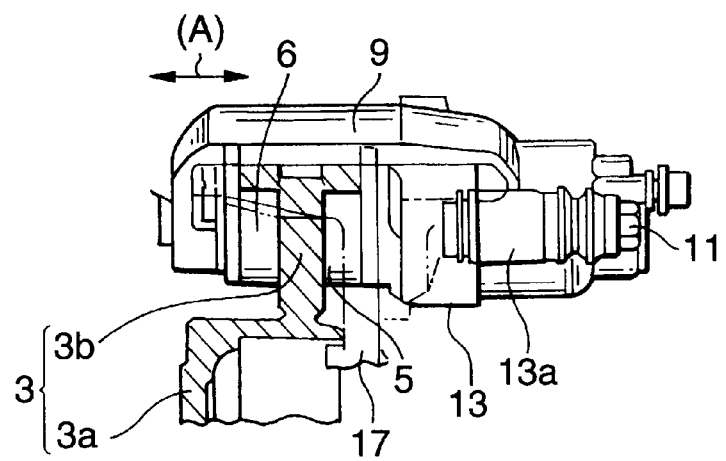
FIG. 9 is a cross-sectional view taken along a line I—I in FIG. 8.

FIG. 4 is a cross-sectional view taken along a line IV—IV in FIG. 1 and is a schematic diagram of a parking brake. FIG. 5 is a front elevational view of a support member in the drum-in disc brake shown in FIG. 1. FIG. 6 is a cross-sectional view taken along a line V—V in FIG. 5. FIG. 7 is a cross-sectional view taken along a line VI—VI in FIG. 5.

A drum-in disc brake 31 in this embodiment is constructed such that a drum brake 37 is incorporated in a central portion of a disc rotor 35 of a disc brake 33. The disc brake 33 includes: the disc rotor 35 which is mounted on the wheel side and is formed by integrating a cylindrical drum portion 35a having a bottom and a rotor portion 35b jutting out in the form of a collar from an edge of an opening of the drum portion 35a toward the radially outward side; a caliper 39 for supporting a pair of an inner friction pad 5 and an outer friction pad 6 disposed in face-to-face relation with the rotor portion 35b placed therebetween in such a manner as to be capable of pressing the pair of friction pads 5 and 6 against the rotor portion 35b; and a support member 43 which is fixedly fitted on the vehicle body side and supports the caliper 39 in such a manner as to be capable of displacing the caliper 39 in the axial direction of the disc rotor 35 (in the direction of arrow (B) in FIG. 2) by a pair of caliper slide pins 41 extending in the axial direction of the disc rotor 35.

As for the pair of friction pads 5 and 6, when the inner friction pad 5 is pressed against the side of the rotor portion 35b by a hydraulic piston 61 accommodated in a cylinder portion 39a of the caliper 39, as shown in FIG. 3, a rear surface of the outer friction pad 6 is pushed out toward the side of the rotor portion 35b by a claw portion 39b of the caliper 39 owing to the resultant displacement of the caliper 39 in the direction of arrow (E). Hence, the two friction pads 5 and 6 assume a state of clamping the rotor portion 35b, thereby generating a braking force. This disc brake 33 is used as a service brake.

Meanwhile, the drum brake 37 includes a backing plate 45 mounted on the vehicle body side so as to cover the opening of the drum portion 35a, and a pair of brake shoes 47 and 48 which are respectively supported by a pair of shoe hold-down devices 65 assembled to the backing plate 45 and are capable of pressing against the inner peripheral surface of the drum portion 35a. When a parking brake cable 51 is pulled in the direction of arrow (C) in FIG. 4, a parking lever 53 which is rotatable is rotated in the direction of arrow (D), and the brake shoes 47 and 48 are opened by drive pistons 55 and. 56 following the rotation of the parking lever 53, thereby functioning as a parking brake.

In this embodiment, as shown in FIG. 5, the support member 43 and the backing plate 45 are integrally molded by casting an aluminum material.

As shown in FIG. 5, the support member 43 is constructed such that a pin supporting portion 43b, to which the caliper slide pin 41 is slidably fitted to support the caliper 39, is provided at a distal end portion of each of a pair of arm portions 43a extending outwardly of the outside diameter of the rotor portion 35b so that the respective caliper slide pin 41 for supporting the caliper 39 is passed on the radially outward side of the rotor portion 35b.

As shown in FIG. 2, the pin supporting portion 43b extends along the axial direction of the disc rotor 35 in such a manner as to straddle the outer side of the rotor portion 35b.

As shown in FIG. 2, the caliper 39 is fixed to end portions of the caliper slide pins 41 by means of bolts 63 which are respectively passed through a pair of arm portions 39c.

As shown in FIG. 5, the backing plate 45 has in its central portion a hole 45a through which an axle is passed. As shown in FIG. 7, a boss portion 45b for supporting a parking mechanism for supporting the parking lever 53 and the drive pistons 55 and 56 mentioned above is integrally formed on the backing plate 45 at the position of one opposing ends of the pair of brake shoes 47 and 48 assembled to the backing plate 45 by the shoe hold-down devices 65. Further, as shown in FIG. 6, an adjuster supporting portion 45c for supporting an adjuster mechanism 68 for adjusting the distance between the brake shoes 47 and 48 is integrally formed on the backing plate 45 at the position of the other opposing ends of the pair of brake shoes 47 and 48.

According to the above-described drum-in disc brake 31, the support member 43 and the backing plate 45 are integrally formed to reduce the number of constituent parts.

Further, as compared with the case where the support member 43 and the backing plate 45 are formed as separate parts, it is possible to reduce the quantity of screw members, for example, necessary for fixation to the vehicle body. Thus, by the reduction of the numbers of fabrication steps and assembling steps, it is possible to attain the reduction of the manufacturing cost.

In addition, since the structure provided is such that the caliper slide pins 41 straddle the outer periphery of the disc rotor 35, and the caliper 39 can be supported uniformly on both sides of the rotor portion 35b, it becomes difficult for an inclination or the like to occur in the caliper 39 due to the braking torque of the friction pads 5 and 6 during the application of a service brake, and it is possible to suppress an increase in the frictional resistance based on the caliper slide pins 41 and reduce the uneven wear of the friction pads 5 and 6.

Furthermore, since the pin supporting portions 43*b* for supporting the caliper slide pins 41 are passed through on the outer side of the outside diameter of the rotor portion 35*b*, when the disc rotor 35 is pulled out in the axial direction for the purpose of such as the maintenance of the brake, if only one caliper slide pin 41, for example, is removed, and the caliper 39 is rotated about the remaining caliper slide pin 41 to the radially outward side of the rotor portion 35*b*, there is no longer an obstacle in the axial direction of the disc rotor 35. Hence, even if the caliper 39 is not removed, it is possible to pull out the disc rotor 35. Accordingly, it is possible to realize the improvement of the detachability and attachability of the disc rotor during maintenance and the like.

In addition, in this embodiment, since the support member 43 and the backing plate 45 are integrally molded by casting an aluminum material, it is possible to attain light weight in addition to the above-described operational advantages.

Incidentally, it goes without saying that as for the specific structure of the various parts of the disc brake 33 and the drum brake 37 described above, design changes may be made appropriately within the scope which does not depart from the spirit of the present invention.

What is claimed is:

1. A drum-in disc brake for braking a rotating member which is rotatable with a wheel and formed by integrating a cylindrical drum portion and a rotor portion jutting out in the form of a collar from the drum portion toward a radially outward side, comprising:

a disc brake including
an inner friction pad and an outer friction pad, respectively disposed in face-to-face relation with the rotor portion placed therebetween,
a caliper for pressing the inner friction pad and the outer friction pad against the rotor portion, and
a support member which is fixedly fitted on a vehicle body side and supports said caliper, wherein said support member is capable of displacing said caliper in an axial direction of said rotating member by caliper slide pins; and a drum brake including
a backing plate mounted on the vehicle body side, and
brake shoes which are respectively supported by said backing plate and are capable of pressing against an inner peripheral surface of the drum portion, wherein:
said drum-in disc brake is capable of effecting braking by said disc brake and braking by said drum brake,
said support member of said disc brake and said backing plate of said drum brake are formed integrally, and
said disc brake is constructed such that the outer friction pad is supported by a claw portion of said caliper so that the brake torque of the outer friction pad is transmitted to said support member through said caliper and the caliper slide pins, and pin supporting portions for respectively supporting the caliper slide pins are provided in said support member so that the caliper slide pins supporting said caliper are passed through on a radially outward side of the rotor portion.

2. The drum-in disc brake according to claim 1, wherein said support member and said backing plate are integrally molded by casting an aluminum material.

3. A drum-in disc brake apparatus for use with a disc rotor, comprising:

a support member adapted to be secured to a drum brake and a disc brake, the disc brake including a caliper;

a backing plate integrally attached to the support member, the backing plate including a first portion adapted to be mounted to a vehicle body side, and a second portion adapted to be mounted to a drum brake;

a plurality of arm portions integrally attached to the support member and extending out from the backing plate beyond the disc rotor;

a pin supporting portion embedded in each of the arm portions to be attached to the caliper of the disc brake, wherein the pin supporting portion is arranged to span across the disc rotor.

\* \* \* \* \*